(12) United States Patent
Siebert et al.

(10) Patent No.: US 7,418,631 B2
(45) Date of Patent: Aug. 26, 2008

(54) PROGRAM-CONTROLLED UNIT

(75) Inventors: Harry Siebert, Puchheim (DE);
Albrecht Mayer, Deisenhofen (DE)

(73) Assignee: Infineon Technologies AG, Munich (DE)

( * ) Notice: Subject to any disclaimer, the term of this patent is extended or adjusted under 35 U.S.C. 154(b) by 459 days.

(21) Appl. No.: 10/217,223

(22) Filed: Aug. 12, 2002

(65) Prior Publication Data

US 2003/0046666 A1   Mar. 6, 2003

(30) Foreign Application Priority Data

Aug. 11, 2001   (DE) ............................... 101 39 660

(51) Int. Cl.
*G06F 11/00* (2006.01)
(52) U.S. Cl. ............................. 714/39; 714/30; 714/31; 714/45
(58) Field of Classification Search ................... 714/30, 714/31, 32, 39, 45
See application file for complete search history.

(56) References Cited

U.S. PATENT DOCUMENTS 5,124,989 A * 6/1992 Padawer et al. ............... 714/38
5,544,311 A * 8/1996 Harenberg et al. ............. 714/40
6,243,836 B1 * 6/2001 Whalen ....................... 714/45

(Continued)

FOREIGN PATENT DOCUMENTS

DE   199 45 900 A1   4/2001

OTHER PUBLICATIONS

MacNamee, Ciaran et al. "Emerging on-chip debugging techniques for real-time embedded systems". http://larc.ee.nthu.edu.tw/~sjtsai/current_research/paper$_{13}$review/Emerging%20on-chip%20debugging%20techniques%20for%20real-time%20embedded%20systems.pdf.*

(Continued)

*Primary Examiner*—Yolanda L Wilson
(74) *Attorney, Agent, or Firm*—Laurence A. Greenberg; Werner H. Stemer; Ralph E. Locher

(57) ABSTRACT

A program-controlled unit has debug resources for monitoring the operations proceeding within the program-controlled unit. The program-controlled unit described is distinguished by the fact that the debug resources contain a CPU, and/or that a portion of the debug resources is provided for monitoring the operations proceeding within the remainder of the debug resources. Debug resources constructed in this way make it possible for errors occurring in program-controlled units to be localized and eliminated rapidly and simply under all circumstances.

35 Claims, 1 Drawing Sheet

U.S. PATENT DOCUMENTS

| | | | | |
|---|---|---|---|---|
| 6,356,960 | B1* | 3/2002 | Jones et al. | 710/5 |
| 6,446,221 | B1* | 9/2002 | Jaggar et al. | 714/30 |
| 6,665,817 | B1* | 12/2003 | Rieken | 714/30 |
| 6,684,343 | B1* | 1/2004 | Bouchier et al. | 714/4 |
| 6,691,270 | B2* | 2/2004 | Blasco Allue et al. | 714/729 |
| 6,769,076 | B1* | 7/2004 | Moyer et al. | 714/30 |
| 6,829,727 | B1* | 12/2004 | Pawloski | 714/28 |
| 6,834,360 | B2* | 12/2004 | Corti et al. | 714/37 |
| 2001/0032305 | A1* | 10/2001 | Barry | 712/34 |
| 2002/0147939 | A1* | 10/2002 | Wenzel et al. | 714/30 |

OTHER PUBLICATIONS

Gonzales, David. "MCORE Architecture implements Real-time Debug Port based on Nexus Consortium Specification".http://www.nexus5001.org/northcon_99.pdf.*

O'Keeffe, Hugh. "IEEE-ISTO 5001-1999, The Nexus 5001 Forum Standard providing the Gateway to the Embedded Systems o the Future".http://www.nexus5001.org/011400_ashling_gepdis_paper.pdf.*

Schmitt, W.: "Nexus-Debug—Konzept der Zukunft?" [Nexus-Debug—Concept of The Future?], Elektronik, No. 17, 1999, pp. 52-59.

* cited by examiner

PROGRAM-CONTROLLED UNIT

BACKGROUND OF THE INVENTION

Field of the Invention

The present invention relates to a program-controlled unit having debug resources for monitoring the operations proceeding within the program-controlled unit.

Program-controlled units such as microprocessors, microcontrollers, signal processors, etc. are known in innumerable embodiments and do not require more detailed explanation.

A known problem of program-controlled units is that it is often not possible or not readily possible to localize and eliminate errors that occur.

For this reason, there has been a changeover to equipping program-controlled units with debug resources that can monitor the operations proceeding within the program-controlled unit. The debug resources include, for example, prior-art on-chip debug support modules and OCDS modules.

Such and other debug resources make it possible to monitor the occurrence of states or events within the program-controlled unit, which states or events can be prescribed from outside the program-controlled unit, and, when such a state or such an event has occurred, to carry out or instigate actions which can be prescribed from outside the program-controlled unit.

The states or events whose occurrence can be monitored by the debug resources include, but are not limited to, the following:

the access by the program-controlled unit or specific components thereof to specific memory addresses or registers, and/or the transfer of specific data within the program-controlled unit, and/or the position of the instruction pointer.

The actions that the debug resources execute or instigate when such a state or other state or event occurs may include but are not limited to:

reporting of the fact that the condition to be monitored has occurred, to a device provided outside the program-controlled unit, the read-out or the alteration of the content of specific memory elements or registers, the outputting of trace information, i.e. the outputting of addresses, data and/or control signals that are used or transferred within the program-controlled unit, to a device provided outside the program-controlled unit, the stopping of the program execution, the continuation of the program execution in the so-called single-step mode, or the execution of routines serving for the debugging or emulation of the program-controlled unit by the CPU of the program-controlled unit.

The provision of debug resources thus affords a whole host of possibilities for localizing and eliminating errors occurring in the program-controlled unit.

However, the possibilities afforded by the debug resources depend on the logic forming the debug resources. Therefore, when planning this logic, it is necessary to carefully weigh what functions the debug resources should or must be able to perform, and what they should or need not. Both debug resources with a functional scope that is restricted to an excessively great extent, and debug resources with an excessively large functional scope are disadvantageous. The former because this means that only simple errors can be found or the debugging is associated with a high outlay, and the latter because this increases the risk of the debug resources themselves not operating properly on account of incorrect operation and/or hardware faults.

SUMMARY OF THE INVENTION

It is accordingly an object of the invention to provide a program-controlled unit that overcomes the hereinafore-mentioned disadvantages of the heretofore-known devices of this general type and that has debug resources that can localize and eliminate errors occurring under all circumstances rapidly and simply.

With the foregoing and other objects in view, there is provided, in accordance with the invention, a program-controlled unit. The program controlled unit includes debug resources such as a CPU. The debug resources monitor operations proceeding within the program-controlled unit.

The program-controlled units according to the invention are distinguished by the following features:

that the debug resources contain a CPU, and/or that a portion of the debug resources is provided for monitoring the operations proceeding within the remainder of the debug resources.

By virtue of the fact that the debug resources contain a CPU, they can execute arbitrarily complex monitoring processes and actions. This is not possible in the case of conventional debug resources, i.e. debug resources constructed using logic, even when a very complex logic is involved. The debug resources constructed using a CPU can, at the same time, even be realized smaller and be operated more easily than conventional debug resources with a large functional scope.

By virtue of the fact that a portion of the debug resources can monitor the operations proceeding within the remainder of the debug resources, errors occurring within the debug resources can also be localized and eliminated. Thus, it is no longer a disadvantage or at any rate a major disadvantage if the debug resources are constructed with greater complexity than has been the case hitherto.

The proposed innovations can be used independently of one another and make it possible, individually and definitely in combination, for errors that occur in program-controlled units to be localized and eliminated under all circumstances rapidly and simply.

Independent of this, it is thereby possible to construct universally useable debug resources which do not have to be adapted, or only have to be slightly adapted, to the program-controlled units in which they are used in each case.

Other features which are considered as characteristic for the invention are set forth in the appended claims.

Although the invention is illustrated and described herein as embodied in a program-controlled unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The program-controlled units described below are microcontrollers. However, the special features of the microcontroller that are described below can also be used in any other program-controlled units, such as microprocessors, signal processors, and the like.

For clarity, only the components of the microcontrollers that are of particular interest are shown.

Figure 1:
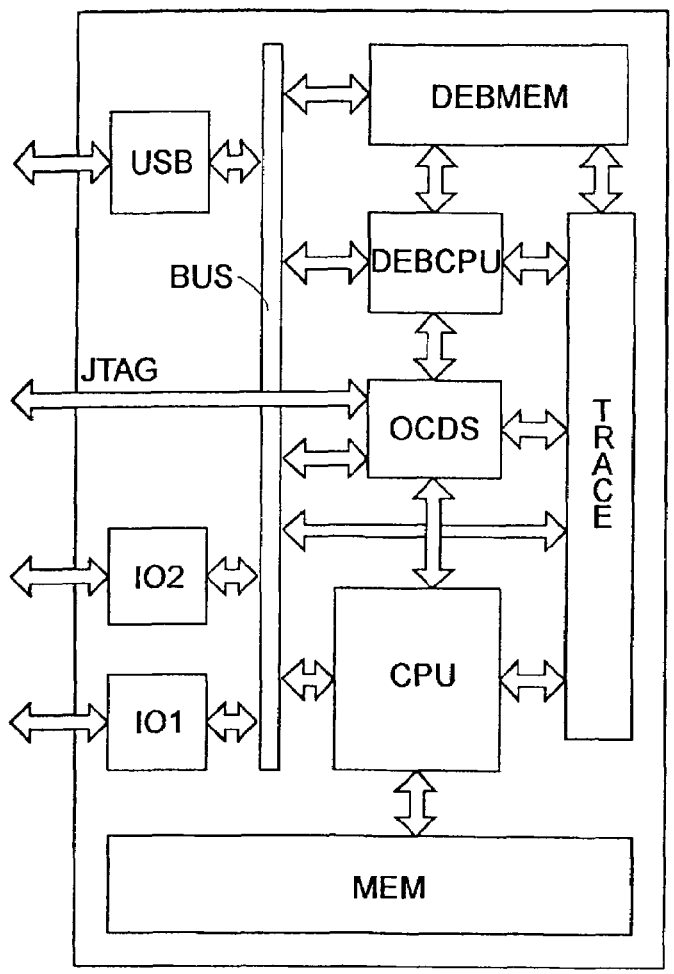
FIG. 1 is a block diagram of a first program-controlled unit with the debug resources according to the invention.

Referring now to the figures of the drawings in detail and first, particularly to FIG. 1 thereof, there is shown the program-controlled unit containing a first CPU having a reference symbol "CPU", a first memory device MEM, a first I/O controller IO1, a second I/O controller IO2, a USB controller USB, and debug resources. The debug resources contain an OCDS module OCDS, a second CPU DEBCPU, a second memory device DEBMEM, and a data acquisition device TRACE.

The aforementioned components are connected to one another via a bus BUS and/or via individual connections as shown in FIG. 1.

In normal operation of the program-controlled unit, the CPU CPU reads from the memory device MEM instructions and operands stored therein and executes these in interaction with the I/O controllers IO1, IO2, the USB controller USB and/or other peripheral units contained in the program-controlled unit.

The debug resources are inactive in normal operation of the program-controlled unit, and are used only during the debugging or emulation of the program-controlled unit.

The debug resources are controlled by a device provided outside the program-controlled unit, which may be a computer, for example. For this purpose, the external device is connected via a JTAG interface JTAG or some other interface of the program-controlled unit to the debug resources (in the example considered to the OCDS module OCDS, but possibly also to one or more other or further components of the debug resources). Via the JTAG interface, the debug resources also output specific data to the external device, which can determine therefrom the operations proceeding in the program-controlled unit.

The OCDS module OCDS monitors the occurrence of conditions within the program-controlled unit, the conditions being prescribed to it by the external device, and executes actions that are prescribed by the external device or fixedly set actions when one or more conditions occur.

In this case, the prescribed conditions whose occurrence is monitored by the OCDS module OCDS may encompass all conditions which can be monitored by conventional OCDS modules, and the actions which the OCDS module OCDS executes or instigates in response to the occurrence of a condition may encompass all actions which can be executed by conventional OCDS modules in such cases.

Accordingly, the states or events whose occurrence can be monitored by the OCDS module OCDS may include, but are not limited to, the following:

the access by the program-controlled unit or specific components thereof to specific memory addresses or registers, and/or the transfer of specific data within the program-controlled unit, and/or the position of the instruction pointer.

The actions that the OCDS module OCDS executes or instigates when such a state or event or other state or event occurs may include, but are not limited to, the following:

reporting of the fact that the condition to be monitored has occurred, to the external device provided outside the program-controlled unit, the read-out or the alteration of the content of specific memory elements or registers, the stopping of the program execution by the CPU CPU, the continuation of the program execution in the so-called single-step mode, or the execution of routines serving for the debugging or emulation of the program-controlled unit by the CPU CPU.

Furthermore, the OCDS module OCDS can also monitor the occurrence of the aforementioned or other conditions within the debug resources, more precisely the occurrence of states or events present within the remainder of the debug resources, that is to say, in the example considered, within the CPU DEBCPU, within the memory device DEBMEM, and/or within the data acquisition device TRACE. Conventional OCDS modules are not able to do this.

For the sake of completeness, the OCDS module also could monitor any other debug resource components in addition to the aforementioned debug resource components or instead of the latter. Independently of this, it might be provided that the operations proceeding within the debug resources could also be monitored by a dedicated (second) OCDS module, which is connected via the abovementioned JTAG interface JTAG or a dedicated JTAG interface or some other interface to the abovementioned external device or another external device. In this case, the second OCDS module could even also track the operations proceeding in the first OCDS module.

As a result, it is possible that the operations proceeding within the debug resources can also be tracked, that is, the debug resources themselves can also be emulated and debugged. Thus, errors that occur within the debug resources can also be localized and eliminated.

Furthermore, the OCDS module OCDS also controls the CPU DEBCPU and the data acquisition device TRACE, and can also be controlled, for its part, by the CPU DEBCPU.

In the example considered, the data acquisition device TRACE is a NEXUS module, and serves for acquiring, compressing, and outputting so-called trace information items. The NEXUS module monitors the occurrence of conditions within the program-controlled unit. The conditions are prescribed by the OCDS module OCDS or the CPU DEBCPU, and outputs, if the condition or one of the conditions is met, without interruption to the operation of the program-controlled unit, addresses, data, and/or control signals that are prescribed by the OCDS module OCDS or the CPU DEBCPU, are used or generated within the program-controlled unit and are not accessible from outside the program-controlled unit without the debug resources. As a result, it is possible, by way of example, but not exclusively by a long way, for the NEXUS module, whenever the CPU CPU would like to read data from a specific address or a specific address range, to output the data fed in response to the CPU CPU.

The NEXUS module is based on the standard that was defined in 1999 by the IEEE Industry Standards and Technology Organization (IEEE-ISTO) and is referred to as "The Nexus 5001 Forum Standard for a Global Embedded Processor Debug Interface". Therefore, with regard to further details in respect of the NEXUS module used in the present case, reference is made to this standard.

The data acquisition device TRACE need not be realized by a NEXUS module. What is important, however, is that the data acquisition device TRACE does not output in each case all of the addresses, data and control signals to which it has access, but rather outputs only a portion thereof, which is prescribed by the CPU DEBCPU or the OCDS module OCDS, and/or only outputs the prescribed or all addresses, data, and control signals if specific conditions are met, for example if and as long as the CPU CPU executes a specific routine, which can be ascertained for example from the addresses from which the CPU CPU fetches the instructions that it executes.

This relieves the burden on the CPU DEBCPU (described in more detail later) to which the data acquisition device TRACE outputs the data to be output by it. Provided that the CPU DEBCPU is correspondingly powerful, the data acquisition device TRACE could be dispensed with, however.

As just mentioned, the data acquisition device TRACE outputs the data to be output by it to the CPU DEBCPU.

The CPU DEBCPU reads from the memory device DEBMEM instructions and operands stored therein, and executes them. It proves to be advantageous if the data stored in the memory device DEBMEM can be written to the memory device DEBMEM from the external device which is provided outside the program-controlled unit and cooperates with the debug resources. The CPU DEBCPU is controlled by the OCDS module OCDS. By outputting corresponding control signals or operands to the CPU DEBCPU, the OCDS module can influence the operations executed by the CPU DEBCPU; the OCDS module can also stop or reset the CPU DEBCPU.

In the example considered, it is incumbent on the CPU DEBCPU to filter out a specific portion from the data fed to it by the data acquisition device TRACE, and to output only these data from the program-controlled unit to the external device, the outputting being effected via the USB controller USB in the example considered.

Conventional data acquisition devices (NEXUS modules) output the data acquired by them—if appropriate after buffer-storage of the data in a memory device provided within the program-controlled unit—immediately from the program-controlled unit.

By virtue of the fact that, in the present case, the data acquisition device TRACE outputs the data acquired by it to the CPU DEBCPU, and the TRACE information items are output to the external device by the CPU DEBCPU, the volume of data output from the program-controlled unit can be considerably reduced.

Reduction of the volume of data is possible inter alia because the CPU DEBCPU is able to check the presence of further conditions which must be met in order that data are output, and/or because the CPU DEBCPU is able to vary the scope of the addresses, data and/or control signals to be output depending on the condition met.

Although this would also be possible, in principle, by using the data acquisition device TRACE, this would nevertheless require, if even only approximately the flexibility which can be obtained by the use of the CPU DEBCPU is intended to be achieved in this case, a very extensive logic or complicated configuration thereof.

By contrast, the CPU DEBCPU can be realized more simply, and the CPU DEBCPU, even when a very simple CPU with a limited functional scope is involved, nevertheless has a greater number of possibilities for optimally adapting to the respective requirements the conditions which must be met for outputting of trace information items, and also the scope of the trace information items that are to be output in each case.

Furthermore, it may also be provided that the CPU DEBCPU checks the conditions which are checked by the OCDS module in conventional debug resources, and/or executes or instigates actions which are instigated by the OCDS module in conventional debug resources. As a result, the tasks to be performed by the OCDS module would be limited to the initialization and/or the control of the remaining debug resource components, and even these tasks can likewise be executed, at least in part, by the CPU DEBCPU.

Figure 2:
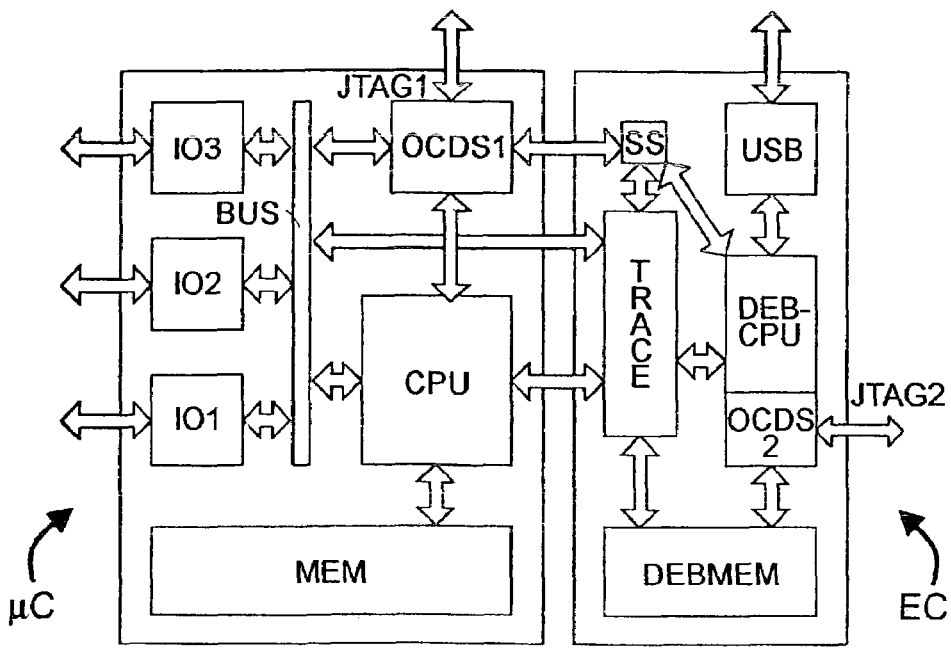
FIG. 2 is a block diagram of a second program-controlled unit with the debug resources according to the invention.

FIG. 2 shows a configuration corresponding to the program-controlled unit in accordance with FIG. 1. In contrast to the configuration shown in FIG. 1, the configuration shown in FIG. 2 includes two chips, namely a first chip µC and a second chip EC.

The first chip µC is a microcontroller having no or only very simple debug resources, and the second chip EC is an emulation chip containing the debug resources described above.

The first chip µC and the second chip EC are soldered one on top of the other using the flip-chip method or are connected to one another in some other way, and then form a unit corresponding to the program-controlled unit in accordance with FIG. 1.

However, the first chip µC can also be used without the second chip EC. Although in that case, for lack of corresponding debug resources, it cannot be debugged or emulated as simply and as comprehensively as is the case with a multichip module also containing the second chip EC and with the program-controlled unit in accordance with FIG. 1, in return, with an otherwise identical performance, it is smaller and less expensive, and consequently better suited to use in mass-produced products.

The first chip µC contains a CPU CPU, a memory device MEM, a first I/O controller IO1, a second I/O controller IO2, and an OCDS module OCDS1.

The aforementioned components are connected to one another via a bus BUS and/or via individual connections as shown in FIG. 2.

The CPU CPU, the memory device MEM, and the I/O controllers IO1 and IO2 correspond to the components of the program-controlled unit in accordance with FIG. 1 that are designated by these reference symbols.

The OCDS module OCDS1 corresponds to a portion of the OCDS module OCDS of the program-controlled unit in accordance with FIG. 1 and corresponds, together with an OCDS module OCDS2 contained in the second chip EC, to the OCDS module OCDS of the program-controlled unit in accordance with FIG. 1

The second chip EC contains debug resources for debugging or emulating the first chip µC, the debug resources containing the OCDS module OCDS2 already mentioned above, a CPU DEBCPU, a memory device DEBMEM, a data acquisition device TRACE, a USB controller USB, and an interface SS.

The CPU DEBCPU, the memory device DEBMEM, the data acquisition device TRACE, and the USB controller USB correspond to the components of the program-controlled unit in accordance with FIG. 1 that are designated by these reference symbols.

In normal operation of the program-controlled unit, the CPU CPU reads from the memory device MEM instructions and operands stored therein, and executes them in interaction with the I/O controllers IO1, IO2, and/or other peripheral units contained in the first chip µC.

The debug resources, i.e. the OCDS module OCDS1, and the second chip EC are inactive in normal operation of the program-controlled unit, and are only used during the debugging or emulation of the program-controlled unit.

The debug resources are controlled by a device provided outside the program-controlled unit, which may be a computer, for example.

For this purpose, the external device may be connected according to the following:

via a JTAG interface JTAG1 or some other interface of the chip μC to the debug resources of the chip μC, more precisely to the OCDS module OCDS1, and/or via a JTAG interface JTAG2 or some other interface of the chip EC to a portion of the debug resources of the chip EC, more precisely to the OCDS module OCDS2, in which case the chip μC can be debugged or emulated via the connection to the OCDS module OCDS1, and in which case the remaining debug resource components, that is to say, in particular, the CPU DEBCPU, but also the memory device DEBMEM, the data acquisition device TRACE, the USB controller USB, and the OCDS module OCDS1 or a part thereof can be debugged or emulated via the connection to the OCDS module OCDS2.

Via the JTAG interfaces JTAG1 and JTAG2, the chips μC and EC also output specific data to the external device, which can determine therefrom the operations proceeding in the program-controlled unit.

In addition to the OCDS module OCDS1, the CPU DEBCPU, the memory device DEBMEM, the data acquisition device TRACE, and the USB controller USB participate in the debugging or emulation of the chip μC; the OCDS module OCDS1 is connected to the aforementioned components via the interface SS of the chip EC. The construction, the function, and the cooperation of the debug resource components that participate in the debugging or emulation of the chip μC do not differ or at any rate do not differ significantly from the construction, function, and cooperation of the debug resource components that participate in the debugging or emulation of the program-controlled unit in accordance with FIG. 1. The connections of the debug resource components among one another and to the unit to be debugged or emulated are also identical. Therefore, with regard to the details concerning the construction, the function, and the cooperation of the debug resource components which participate in the debugging or emulation of the chip μC, reference is made to the description of the corresponding components of the program-controlled unit in accordance with FIG. 1. All that is different is that the debug resource components provided for the debugging or emulation of the chip μC are accommodated in part in a dedicated chip (the chip EC).

Only the OCDS module OCDS2 participates in the debugging or emulation of the debug resources. The module corresponds, apart from its use, more precisely to the use for debugging or emulation of debug resources, to a conventional OCDS module. However, the debug resources which are provided for the debugging or emulation of the debug resources by which the chip μC can be debugged or emulated can also be constructed like the debug resources for the debugging or emulation of the chip μC, that is to say, in particular, likewise contain a CPU and/or a data acquisition device TRACE.

The debug resources of the program-controlled units described make it possible, independently of the details of the practical realization, for errors occurring in program-controlled units to be localized and eliminated under all circumstances rapidly and simply.

We claim:

1. A program-controlled unit including a program execution processor, said program-controlled unit comprising:
   debug resources divided into a first portion and a second portion;
   said first portion including a debug resources CPU, in addition to the program execution processor, said first portion monitoring operations, said first portion being inactive in normal operation of the program-controlled unit;
   said second portion for debugging the operation of at least a portion of said first portion during operation of said first portion, said second portion being separate from said first portion;
   a first memory device accessible by the program execution processor for reading and executing instructions and operands stored therein; and
   a second memory device accessible by said debug resources CPU for reading and executing instructions and operands stored therein.

2. The program-controlled unit according to claim 1, wherein said debug resources CPU executes actions defined by an external device.

3. The program-controlled unit according to claim 2, wherein said second memory device includes instructions provided by the external device.

4. The program-controlled unit according to claim 2, wherein said second memory device stores instructions to be executed by said debug resources CPU upon instigation by the external device.

5. The program-controlled unit according to claim 2 wherein the external device influences a sequence of the actions to be executed by the debug resources CPU.

6. The program-controlled unit according to claim 2, wherein the external device instigates a change in a sequence of the actions to be executed by the debug resources CPU.

7. The program-controlled unit according to claim 1, wherein said debug resources CPU executes instructions determining if conditions have occurred, the conditions being selected from the group consisting of specific states and events.

8. The program-controlled unit according to claim 7, wherein said debug resources CPU instigates specific actions when at least one of the conditions have been met.

9. The program-controlled unit according to claim 8, wherein the specific actions include outputting specific data to the external device.

10. The program-controlled unit according to claim 8, wherein the specific actions include outputting specific trace information items to the external device.

11. The program-controlled unit according to claim 10, wherein said debug resources CPU is fed a portion of the trace information items and selects the specific trace information items for outputting from the trace information items.

12. The program-controlled unit according to claim 11, further comprising a data acquisition device selecting a specific portion of the trace information items and feeding the specific portion of the trace information items to said debug resources CPU).

13. The program-controlled unit according to claim 12, wherein said data acquisition device is a NEXUS module.

14. The program-controlled unit according to claim 1, wherein said debug resources CPU controls at least an additional portion of the debug resources.

15. The program-controlled unit according to claim 1 wherein said first portion includes a first OCDS module and said second portion includes a second OCDS module, separate from said first OCDS module.

16. The program-controlled unit according to claim 15, wherein said second OCDS module monitors the occurrence of specific conditions within said first OCDS module and executes specific actions when at least one of the specific conditions occurs.

17. The program-controlled unit of claim 15, wherein only said second OCDS module participates in the debugging of the debug resources.

18. A program-controlled unit, comprising:
debug resources divided into a portion and a remainder, said portion and said remainder being separate from one another, said remainder having operations proceeding therein, and said portion monitoring the operations proceeding within said remainder, to check for errors within said remainder, in order to debug said debug resources.

19. The program-controlled unit according to claim 18, wherein said portion of said debug resources monitoring the operations proceeding within said debug resources monitors occurrence of specific conditions within said debug resources and executes specific actions when at least one of said conditions occur.

20. The program-controlled unit according to claim 18, wherein said portion of said debug resources monitoring the operations proceeding within said debug resources is an OCDS module, said remainder additionally including an OCDS module.

21. The program-controlled unit according to claim 18, wherein said debug resources include a CPU.

22. The program-controlled unit according to claim 21, wherein said CPU executes actions defined by an external device.

23. The program-controlled unit according to claim 22, wherein said debug resources include a memory device for storing instructions to be executed by said CPU, said memory device being written to by the external device.

24. The program-controlled unit according to claim 22, wherein said debug resources include a memory device for storing instructions to be executed by said CPU, said memory device being written to upon instigation by the external device.

25. The program-controlled unit according to claim 22, wherein said CPU executes a sequence of a program, the sequence being influenced by the external device.

26. The program-controlled unit according to claim 22, wherein said CPU executes a sequence of a program, the sequence being influenced upon instigation by the external device.

27. The program-controlled unit according to claim 21, wherein said CPU executes instructions determining if conditions have occurred, the conditions being selected from the group consisting of specific states and events.

28. The program-controlled unit according to claim 27, wherein said CPU executes further instructions instigating specific actions when the conditions occur.

29. The program-controlled unit according to claim 28, wherein the specific actions include outputting specific data to the external device.

30. The program-controlled unit according to claim 28, wherein the specific actions include outputting specific trace information items to the external device.

31. The program-controlled unit according to claim 30, wherein said CPU is fed a portion of outputtable trace information items, selects appropriate portions of the outputtable trace information, and outputs the appropriate portions of the outputtable trace information.

32. The program-controlled unit according to claim 31, further comprising a data acquisition device originating the trace information items being fed to the CPU, selecting a specific portion of the trace information items as the outputtable trace information items which could be output from the program-controlled unit, and feeding the outputtable trace information items to said CPU.

33. The program-controlled unit according to claim 32, wherein said data acquisition device is a NEXUS module.

34. The program-controlled unit according claim 21, wherein said CPU controls at least a portion of said first OCDS module.

35. In a program-controlled unit including a program execution processor and additionally including debug resources for monitoring operations proceeding within the program-controlled unit, the improvement which comprises:
a first OCDS module and a debug resources CPU included in the debug resources, said debug resources being inactive in normal operation of the program-controlled unit;
a second OCDS module included in the debug resources, separate from the first OCDS module, for debugging the operation of at least a portion of the debug resources;
a first memory device accessible by the program execution processor for reading and executing instructions and operands stored therein; and
a second memory device accessible by said debug resources CPU for reading and executing instructions and operands stored therein.

* * * * *